No. 844,908. PATENTED FEB. 19, 1907.
J. L. ALBIN.
POTATO DIGGER.
APPLICATION FILED JULY 28, 1906.
2 SHEETS—SHEET 1.
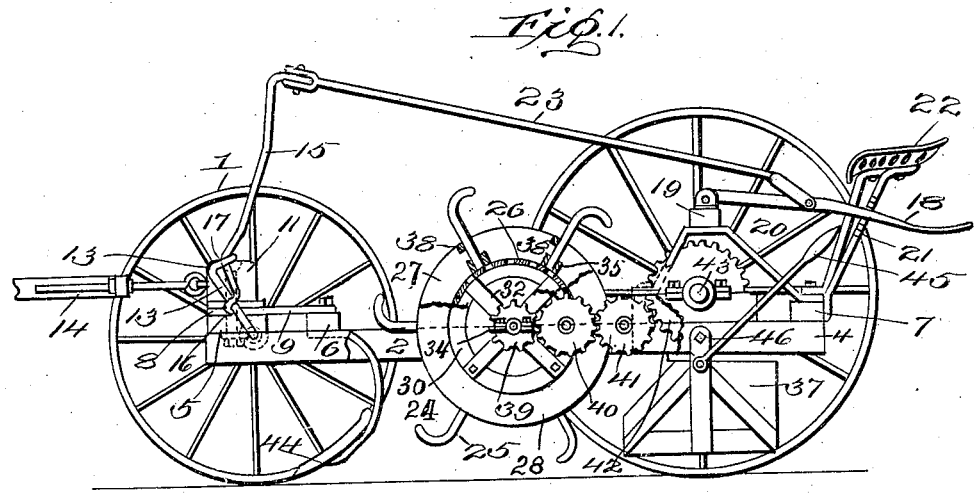
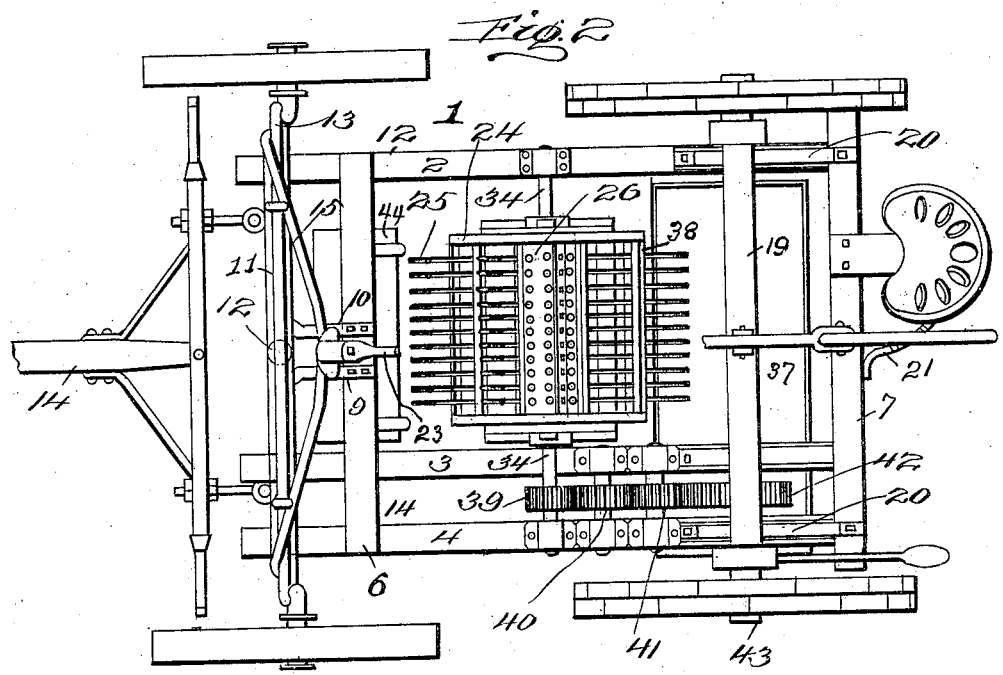
Witnesses
J. M. Fowler Jr.
O. S. Kitchin
Inventor
John L. Albin
By Mason, Fenwick & Lawrence
his Attorneys

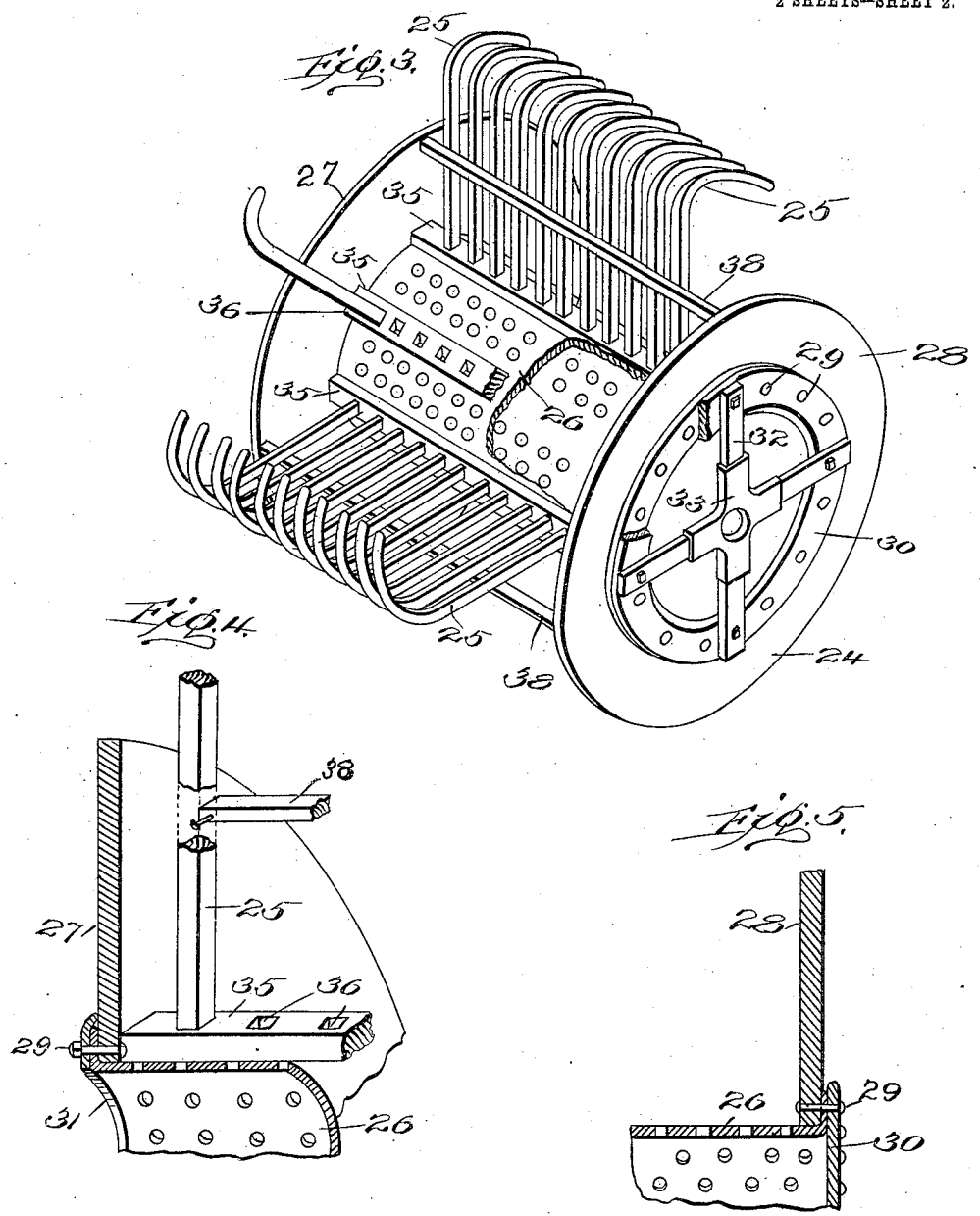

UNITED STATES PATENT OFFICE.

JOHN L. ALBIN, OF KIOWA, COLORADO.

POTATO-DIGGER.

No. 844,908. Specification of Letters Patent. Patented Feb. 19, 1907.

Application filed July 28, 1906. Serial No. 328,202.

*To all whom it may concern:*

Be it known that I, JOHN L. ALBIN, a citizen of the United States, residing at Kiowa, in the county of Elbert and State of Colorado, have invented certain new and useful Improvements in Potato-Diggers; and I do hereby declare the following to be a full, clear, and exact description of the invention, such as will enable others skilled in the art to which it appertains to make and use the same.

This invention relates to improvements in potato-diggers, and particularly to that class which are adapted to be placed upon a vehicle and drawn about in the usual manner of vehicles.

The invention comprises the production of a vehicle, a plow secured to said vehicle for loosening the earth, means positioned in the rear of the plow for removing potatoes and the like from the earth loosened by said plow, and means located on said vehicle for throwing said potato-gathering means in and out of operation.

The invention further comprises the production of a potato-digging device having a perforated cylinder, flanged sides secured to said cylinder, and a plurality of rows of pins or forks for removing and raising potatoes and the like from the earth and conveying the same to a suitable receptacle.

The invention still further comprises the production of a vehicle, a cylinder mounted upon said vehicle provided with teeth or forks for removing and separating potatoes and the like from the earth, and means connecting said cylinder with one of the wheels of the vehicle for transmitting rotary motion thereto.

The object in view is the production of a potato-digger that may be raised and lowered into and out of operative position at any time and of means for receiving the potatoes after the same have been removed from the earth.

Another object in view is the production of a vehicle, a curved-toothed cylinder mounted thereon and adapted to be raised and lowered for permitting the teeth thereof to raise potatoes and the like from the earth and deposit the same in a suitable receptacle provided for that purpose, and mechanism for revolving said cylinder and teeth.

With these and other objects in view the invention comprises certain other novel constructions, combinations, and arrangements of parts, as will be hereinafter more fully described and claimed.

In the accompanying drawings, Figure 1 is a side elevation of the preferred embodiment of my invention. Fig. 2 is a top plan view of Fig. 1. Fig. 3 is a detail perspective view of the teeth-carrying cylinder, certain parts being removed to better disclose the invention. Fig. 4 is a detail fragmentary perspective view of a portion of one end of the cylinder, showing how the teeth are inserted in place. Fig. 5 is a detail fragmentary perspective view showing how the flanges are secured to the perforated cylinder.

In the production of a machine for removing potatoes and the like from the earth it has been the object to produce a machine that may be easily drawn over the ground and yet be so operated as to remove the potatoes and deposit the same in some receptacle carried by the machine, so that the same may be dumped in piles over the field as the machine is operated rather than scattered along on top of the ground after the machine has passed.

The present invention relates to machines having mechanism that will loosen the earth as it passes over the field, gather up the potatoes and the like from the loosened earth, and carry the same along to any predetermined place and dump the same in piles.

Referring more particularly to the drawings, 1 indicates any suitable vehicle, which is provided, preferably, with four wheels, the rear two of which are used as driving-wheels for rotating mechanism, which will be more fully described hereinafter. The vehicle is provided, preferably, with a framework comprising longitudinal bars 2, 3, and 4 and cross-bars 5, 6, and 7. Secured to the cross-bar 5 is the lower half of a fifth-wheel 8, which has a pair of braces 9 and 10 for more rigidly holding the same in place. Secured to a pivotally-mounted cross arm or bar 11 is the upper portion of the fifth-wheel 8, which is adapted to operate upon the lower portion of the fifth-wheel in the usual and well-known manner. The cross-bar 5, which is rigidly secured to the framework of the vehicle, is pivotally secured to the arm 11 by means of a suitable king-bolt 12, that is adapted to pass centrally of the fifth-wheel 8 in the usual manner.

Pivotally secured to the bar 11 is an inverted substantially U-shaped bar 13, which is adapted to receive a pair of wheels on the end thereof and to act as the front axle of the vehicle. As will be clearly seen from Fig. 1, the U-shaped member 13 carries the front wheels of the vehicle and is connected to the frame thereof only through the cross-arm 11 and the king-bolt 12, so that the front wheels of the vehicle may be turned in any direction desired for guiding and controlling the motion thereof. Secured to the arm 11 is any suitable draft appliance 14 for use in drawing the vehicle from place to place as may be desired. A rod or bar 15 is provided to engage the substantially U-shaped member 13 at 16 and 17, as will be clearly seen in Fig. 1. The weight of the front part of the vehicle, as will be seen in Fig. 1, is exerted a short distance in front of the axle, so that there is a continual strain or tendency on the upper part of the axle and cross-bar 11 to descend, and consequently permit the front wheels to take a position near the rear wheels, and consequently lower the arm 11 and cross-bar 5 nearer the earth. The arm 15, engaging the U-shaped member 13, as above indicated, when held in the position as shown in Fig. 1 will prevent the front wheels of the vehicle from changing their position, and consequently hold the body of the vehicle a considerable distance above the ground.

A lever 18 is pivotally secured to a cross-bar 19, which in turn is mounted upon suitable braces, as 20, said lever being adapted to engage the rack 21, secured to the cross-bar 7 and to the seat 22. Pivotally secured to the lever 18 is a connecting bar or rod 23, which is also pivotally connected to the arm 15 for holding the same in the position shown in Fig. 1 for holding the frame of the vehicle a considerable distance from the ground. When it is desired to lower the body of the vehicle nearer the ground, and consequently the mechanism, the lever 18 is disengaged from the rack 21, and acting through the rod 23 the bar 15 is moved forward and permits the upper portion of the U-shaped member, together with the cross-bar 11, to descend toward the earth, and consequently acting through the king-bolt 12 lowers the front end of the body of the vehicle 1.

Secured substantially midway of the frame or body of the vehicle is a spool-shaped cylinder 24, carrying any desirable number of rows of teeth 25. The spool-shaped member or cylinder 24 is provided with a perforated cylindrical portion 26, which has secured to the ends thereof flanges 27 and 28, as will be clearly seen in Figs. 4 and 5. The cylindrical portion 26 is turned up or flared at its ends and securely riveted in place to the flanges 27 and 28 by means of suitable bolts or rivets 29. Rings 30 and 31 are positioned on the outside of the flared ends of the cylinder 26 and the rivets 29 passed therethrough to hold the same firmly in place. Thus it will be seen that the rings 30 and 31 assist in holding the ends of the cylinder firmly in contact with the flanges 27 and 28. Suitably secured to the rings 30 and 31 is a spider 32, which is preferably formed with an enlarged portion 33 in the center thereof for providing a suitable bearing for securing in place an operating rod or shaft 34, which is adapted to pass therethrough. The rod 34 is rigidly secured to the spider 32, so that when the same is revolved the spider and the spool carried thereby are revolved.

Secured to the cylinder 26 and the flanged ends 27 and 28 are any suitable number of bars 35, which have formed therein sockets 36 for accommodating the lower ends of the teeth 25. The teeth preferably extend at a right angle from the bar 35 to a short distance beyond the flanged ends 27 and 28 and are then curved until the ends are at a substantially right angle to the main body of the teeth. By thus forming the teeth at such an angle a housing or pocket is provided which will retain the potatoes and the like that are removed from the earth until the cylinder is revolved to such an extent as to permit the potatoes to fall by gravity out of the pocket formed between the row of teeth 25 and the side members 27 and 28. As gravity begins to act upon the potatoes they will fall against the next row of teeth preceding the one which has removed them from the earth and will continue their travel until they finally land in a suitable box or receptacle 37, as will be clearly seen in Fig. 1. A suitable brace, as 38, is secured to the side members 27 and 28 at their periphery for bracing the teeth 25 to assist in resisting strains exerted thereon during the operation of said teeth.

Secured to the axle 34, which passes through the cylinder 24, is a gear or pinion 39. The gear-wheel 39 is positioned between the bars 3 and 4 and is adapted to engage a connecting-pinion 40, which in turn engages another connecting-pinion 41. The pinion 41 engages a driving-gear 42, which is rigidly secured to the axle 43, upon which are mounted the rear wheels of the vehicle 1. As the rear wheels of the vehicle revolve, carrying with them the rear axle, the same will rotate the gear 43 and in turn the connecting-gears 40 and 41, which will, as will be clearly seen in Fig. 1, revolve the gear 39, connected with the shaft 34. As the shaft 34 revolves the motion is transmitted to the cylinder 24, and consequently the teeth 25 are operated for removing potatoes and the like from the ground, provided, of course, the frame has been lowered so as to permit the teeth 25 to enter the earth.

Positioned in front of the cylinder 24 is any suitable plow 44, preferably of the shovel kind. The plow 44 is simply adapted to enter the earth and loosen the same up, so that as the revolving teeth pass through the earth the same will be permitted to easily remove the potatoes therefrom and carry the same over and dump the same into the receptacle 37. The plow 44 thus loosens the earth up, so as to allow the potatoes to be readily removed therefrom by the pins or forks 25 without raising any large pieces of dirt therewith. In case any dirt is raised with the potatoes the same will be sifted through between the teeth 25 or perforations in the cylinders 26.

In operation when it is desired to move the potato-digger from place to place the same will be brought into the position shown in Fig. 1, in which the front of the body of the vehicle is raised and the lever is in engagement with the rack 21. This, as will be clearly seen, raises the plow 44 out of the ground and raises the teeth 25, so as to prevent the same from contacting with the earth. When it is desired to use the device for removing potatoes, the lever 18 is disengaged from the rack 21, and the front end of the body of the vehicle is permitted to descend and allow the plow 44 to enter the earth any desired distance for loosening the same. At the same time that the plow 44 is lowered into the earth the teeth 25 are also lowered, so as to pass through the earth as the same revolves. In practical operation as the vehicle passes along the dirt will be loosened and pass upwardly and over the rear end of the plow 44, and most of it will be caught by the teeth 25 as the same passes along before the earth thus loosened up reaches its normal position on the ground. In this way the teeth 25 pass through the loosened earth before the same is permitted to again be packed in the slightest degree, and consequently less power is required in forcing the teeth 25 through the earth. After the teeth 25 have removed the potatoes from the earth and conveyed the same to the box 37 the potatoes will remain in the box until the same is tilted or dumped through the operation of the arm-lever 45. To permit the dumping of the box 37, the same is pivotally secured at 46 to the rear end of the body of the vehicle, as will be clearly seen in Fig. 1. By thus providing a potato-digger that will loosen the earth and remove the potatoes from the loosened earth and deposit the same in a box receptacle carried by the vehicle a device is produced that will dig the potatoes as it travels and deposit the same in bunches or piles at convenient intervals, as may be desired.

Having thus fully described my invention, what I claim as new, and desire to secure by Letters Patent, is—

1. In a device of the character described, the combination of a movably-mounted frame, a perforated cylinder carried by the frame, an outwardly-extending annular flange at each end of the cylinder, a series of teeth projecting outwardly from the cylinder, a ring secured to each end of the cylinder, a spider carried by each ring, a shaft journaled in the frame and passing through the spiders, and means for imparting motion to the cylinder through the movement of the frame.

2. In a device of the character described, the combination of a movably-mounted frame, a cylinder carried by the frame, an outwardly-projecting annular flange at each end of the cylinder, a series of bars extending longitudinally of the cylinder, and connecting the bases of the flanges, the said bars being provided with sockets, a series of radial teeth having their inner ends inserted in the said sockets while their outer ends are bent laterally, brace-bars connecting the upper portions of the flanges and arranged along one side of each of the rows of teeth, and means for imparting a rotary movement to the cylinder through the movement of the frame.

3. In a device of the character described, the combination of a movably-mounted frame, a perforated cylinder carried by the frame, and having the opposite ends thereof flared outwardly, an annular and outwardly-projecting flange located at each end of the cylinder and secured to the inner face of the outwardly-flared end thereof, a ring secured to the outer face of each of the outwardly-flared ends, a spider carried by each ring, a shaft journaled in the frame and passing through the spiders, means for imparting motion to the cylinder, and a series of teeth projecting outwardly from the said cylinder.

In testimony whereof I have affixed my signature in presence of two witnesses.

JOHN L. ALBIN.

Witnesses:
　CARLE WHITEHEAD,
　W. B. SHATTUC.